United States Patent [19]

Sauer et al.

[11] Patent Number: 4,554,852

[45] Date of Patent: Nov. 26, 1985

[54] CUTTING MACHINE FOR SLICING CIRCULAR ARTICLES INTO WEDGES

[75] Inventors: Robert L. Sauer, Hudson; Charles G. Morrissette, Shaker Heights; Stanley J. Garbaczik, Sr.; Stanley J. Garbaczik, Jr., both of Maple Heights, all of Ohio

[73] Assignee: Food Equipment Manufacturing Corporation, Maple Heights, Ohio

[21] Appl. No.: 517,467

[22] Filed: Jul. 26, 1983

[51] Int. Cl.⁴ .............................................. B26D 3/24
[52] U.S. Cl. .................................... 83/407; 83/409.1; 83/429; 30/114
[58] Field of Search ................. 83/35, 36, 407, 409.1, 83/409.2, 426, 429, 409, 410, 413; 30/114

[56] References Cited

U.S. PATENT DOCUMENTS

| | | | |
|---|---|---|---|
| 1,357,241 | 11/1920 | McGee | 83/407 |
| 1,640,951 | 8/1927 | Leibing | 83/407 |
| 1,992,714 | 2/1935 | Nelson | 83/407 |
| 2,131,851 | 10/1938 | Anstice | 83/429 |
| 2,448,934 | 9/1948 | Van Derhoef et al. | 83/429 |
| 2,839,099 | 6/1958 | Muller | 83/308 X |
| 3,114,403 | 12/1963 | Rianda | 83/407 |
| 4,100,830 | 7/1978 | Lakatos | 83/426 X |
| 4,215,613 | 8/1980 | Anderson | 83/676 X |

Primary Examiner—James M. Meister
Attorney, Agent, or Firm—Pearne, Gordon, Sessions, McCoy, Granger & Tilberry

[57] ABSTRACT

A machine for dividing articles into wedge-shaped portions which includes a conveyor for transporting the articles along a processing path and a series of cutting stations spaced along the path. Individual article carriers, each supported on the conveyor for rotation about an axis perpendicular to the processing path, carry the articles through successive cutting stations. The carriers and associated articles are rotationally indexed between cutting stations by cam surfaces disposed along the processing path to cause the articles to be cut at the cutting stations on angularly displaced lines. The cutting stations include a rotary blade that is power-driven at a speed that approximates the speed of the conveyor to eliminate article handling problems as well as fouling of the apparatus and articles.

3 Claims, 10 Drawing Figures

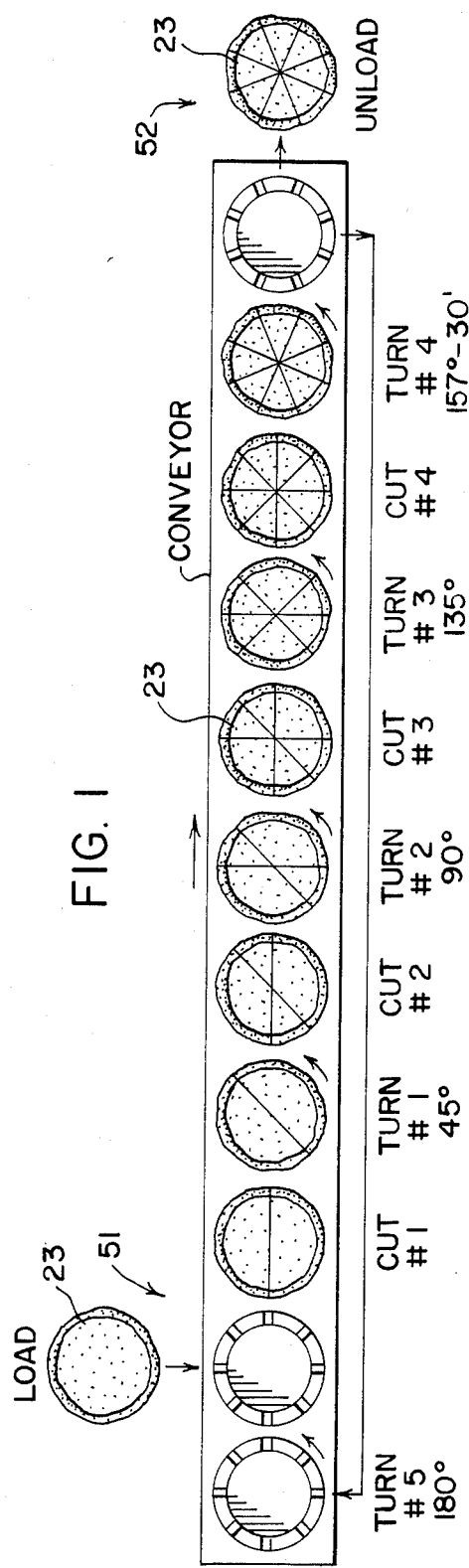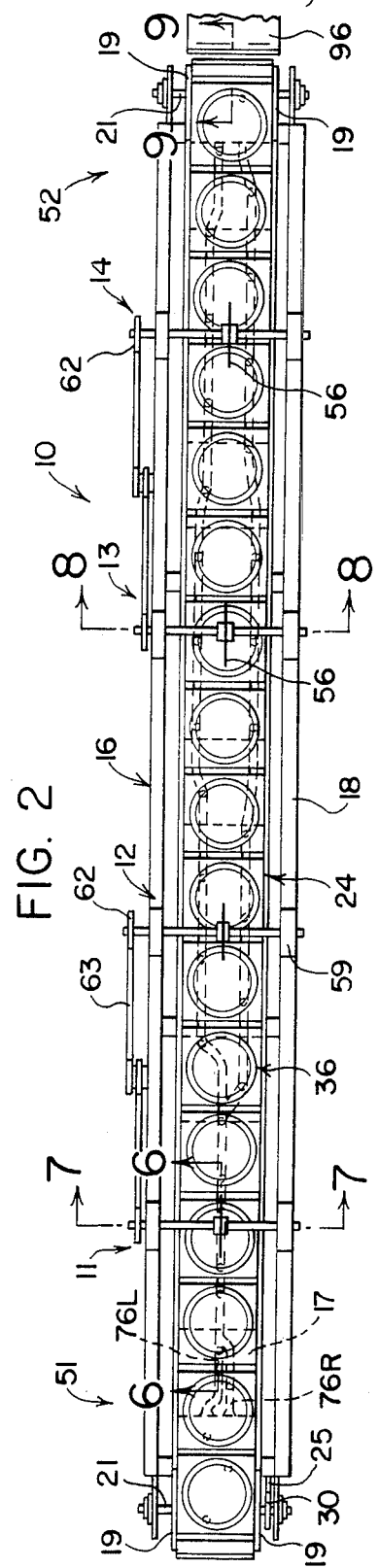

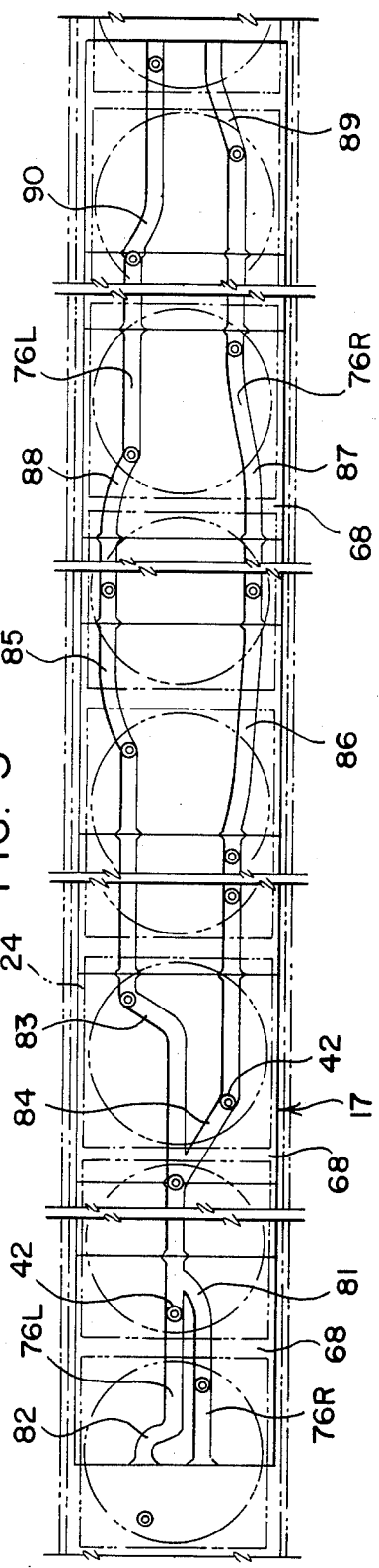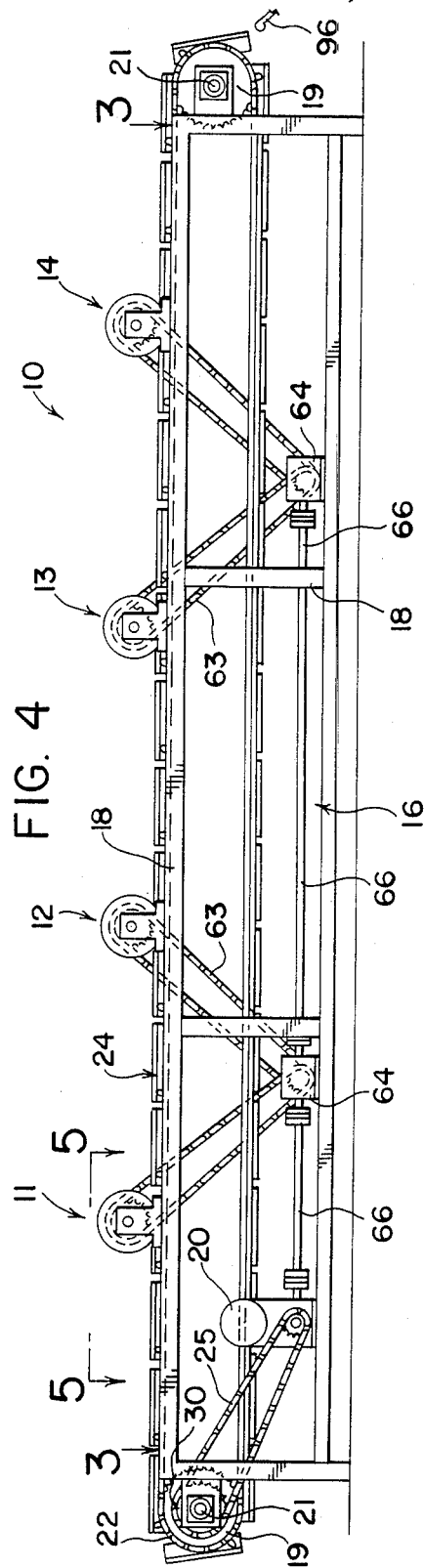

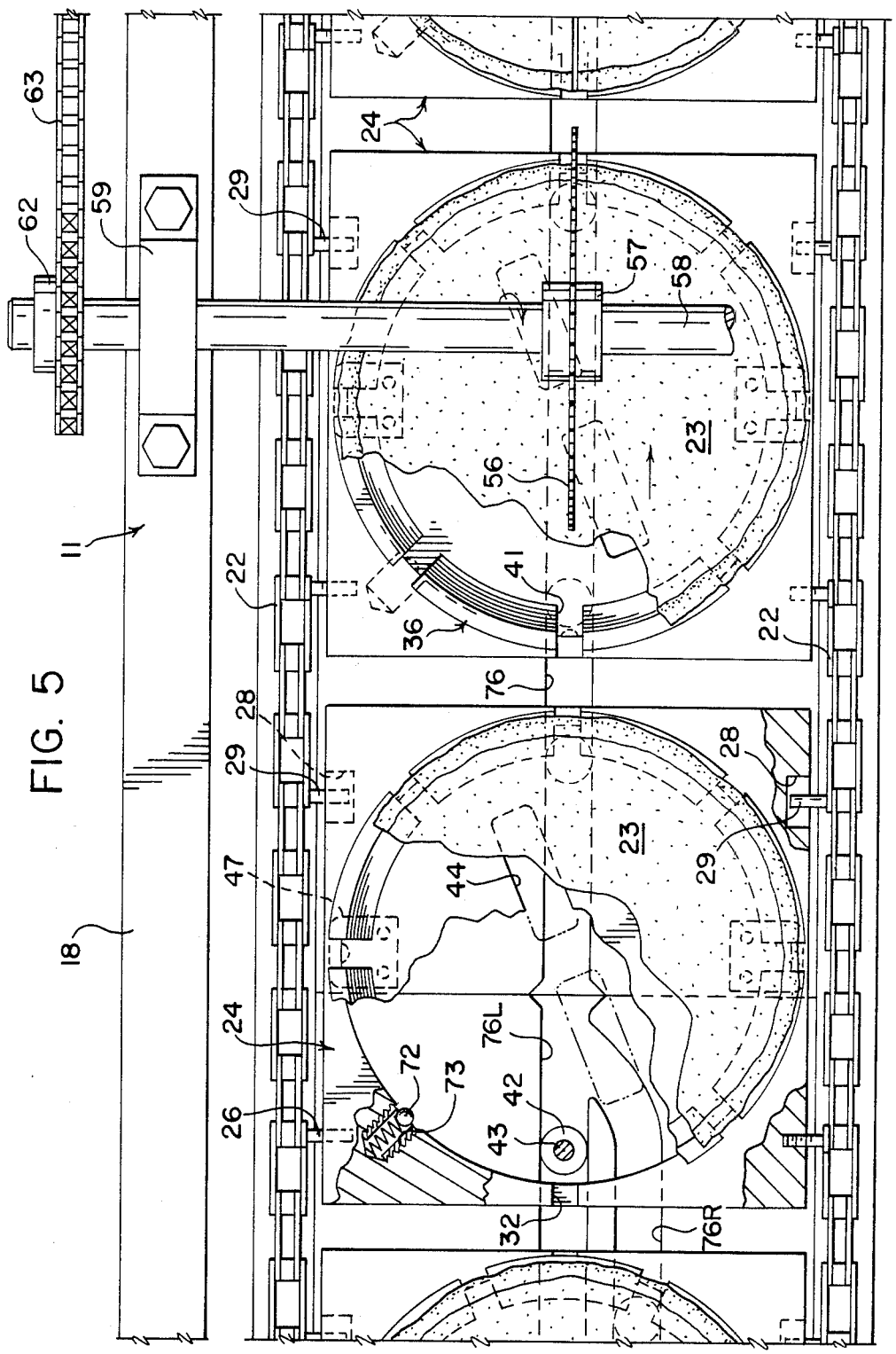

CUTTING MACHINE FOR SLICING CIRCULAR ARTICLES INTO WEDGES

BACKGROUND OF THE INVENTION

The invention relates to power-operated slicing apparatus and, more particularly, to apparatus for slicing an article on a plurality of angularly related lines.

PRIOR ART

In the commercial preparation of food, for example, there is a need for slicing whole products, such as pies, cakes, pizzas, and the like, into individual pieces. Typically, where the whole product is circular, for instance a pie, it is divided into sectors or wedges. In high volume processing plants, the slicing of a product, if not automated, can be a bottleneck in a production line and can involve significant labor costs. It has been estimated that with available manually actuated slicing equipment, it would take approximately 60 people to slice 40 pies per minute each into eight or ten segments.

SUMMARY OF THE INVENTION

The invention provides automatic power slicing apparatus for dividing a product into a plurality of sections by repeatedly cutting the product on angularly related lines. In accordance with the invention, the product is conveyed through a path along which at successive stations it is alternately sliced and then turned about an axis perpendicular to the path.

One application of the invention is the sectioning of round products or articles, such as pies, cakes, pizzas, and the like, into customary sections or wedges. A round product is cut diametrally so that for each pass through a slicing station two pieces are formed. A constant angle through which the product is turned between slicing stations corresponds to the desired number of equal-sized pieces produced when the product has completed its course through the slicing path.

In the disclosed embodiment, the product is conveyed by an endless chain through a path of successive slicing stations. The product is initially received at one end of the path on a carrier basket fixed to the endless chain. The connection of the basket to the chain permits its rotation about an axis perpendicular to the path. Basket rotating means disposed between adjacent slicing stations is operative to rotationally index the basket and the product carried by it through an angle equal to the angular size of the pieces desired. In a preferred embodiment, the basket rotating means comprises a stationary cam track in spaced, parallel relationship to the path taken by the endless chain and basket past the slicing stations. Cam follower means disposed on the basket engages the cam track and responds to its profile to change the angular orientation of the basket.

BRIEF DESCRIPTION OF THE DRAWINGS

FIG. 1 is a diagrammatic plan view of a cutter apparatus embodying the invention, in which articles are conveyed along a path wherein they are alternately sliced and rotationally indexed;

FIG. 2 is a simplified plan view of a conveyor and associated cutters of the apparatus;

FIG. 3 is a somewhat schematic, fragmentary plan view on an enlarged scale of cam plate means disposed along the conveyor path;

FIG. 4 is a side elevational view of the conveyor and cutters of FIG. 2;

FIG. 5 is a plan view, on an enlarged scale and in greater detail, of a portion of the cutter apparatus indicated by the lines 5—5 of FIG. 4;

DESCRIPTION OF THE PREFERRED EMBODIMENT

Figure 6:
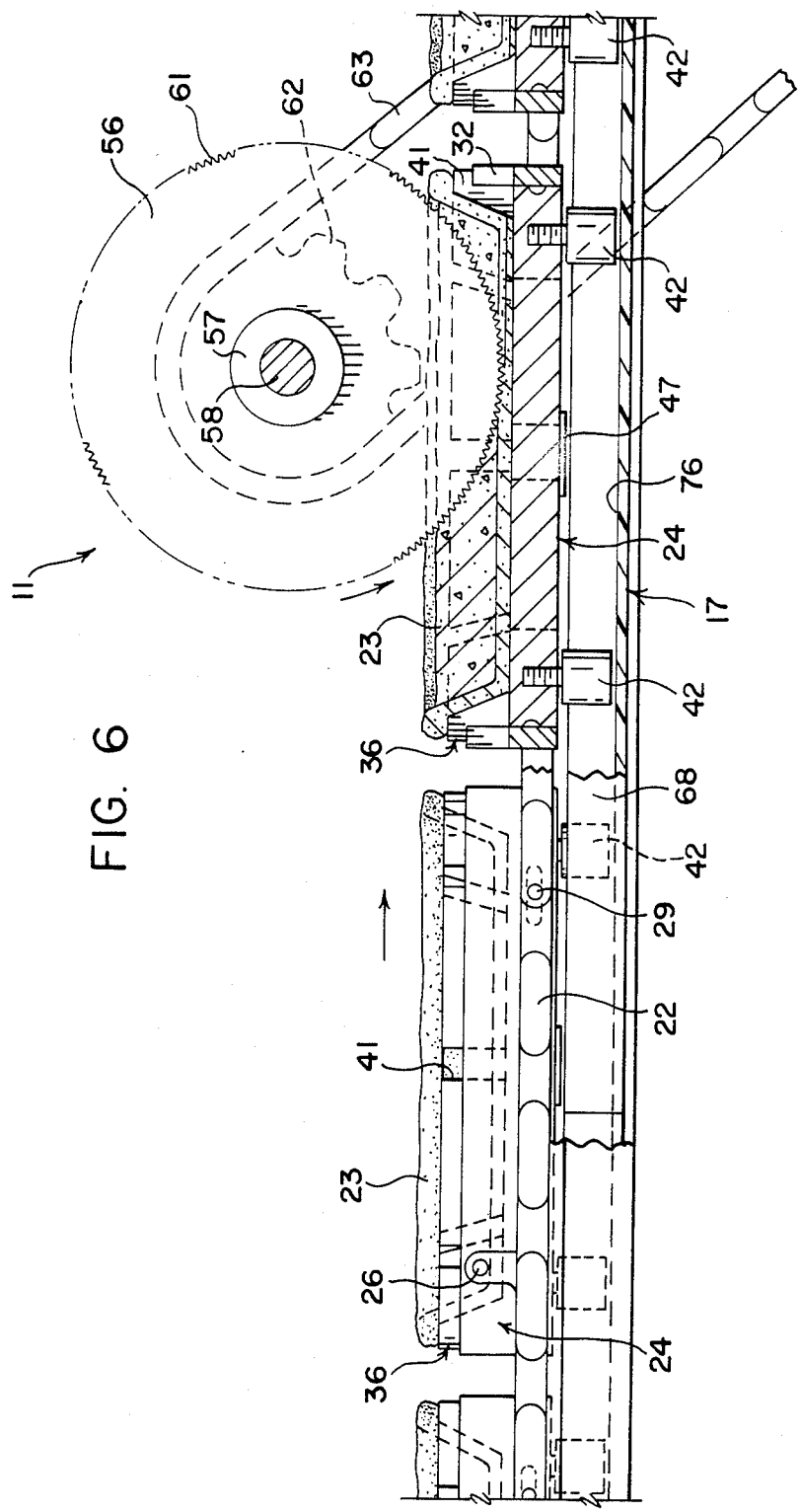
FIG. 6 is a cross-sectional view, taken in a vertical longitudinal plane indicated by the lines 6—6 of FIG. 2, of a portion of the cutter apparatus.

Referring now to the drawings, and in particular to FIGS. 2 and 4, there is shown cutter apparatus 10 constructed in accordance with the invention. The apparatus 10 includes a conveyor 16, cutting stations 11-14 spaced along the conveyor path, and a cam track 17 extending along the conveyor path.

The conveyor 16 includes a frame, generally designated at 18, fabricated preferably from square tubing, angles and like structural elements. When the cutter apparatus 10 is to be used for slicing food products, these structural elements are preferably formed of stainless steel or aluminum. At each end of the frame 18 there are provided pairs of chain sprockets 19 fixed to shafts 21 journaled on suitable bearings on the frame. At each side of the frame 18, in parallel relation to one another, are endless roller chain loops 22 trained over respective sprockets 19. The shaft 21 at the left in FIG. 4, is power-driven by a suitable electric gear motor, schematically illustrated at 20 through a roller chain 25 and sprocket 30 in a customary manner, whereby the chains 22 are driven at a constant speed along the frame 18. The upper reach of the chains 22 between the sprockets 19 forms a processing path for articles 23 (FIG. 1) being sliced on the apparatus 10. The lower reach of the chains 22 forms a return path for the chain and machine elements mounted thereon. The gear motor drive 20 for the conveyor 16, where desired, can be adjustable in speed and is responsive to suitable controls known in the art.

Figure 10:
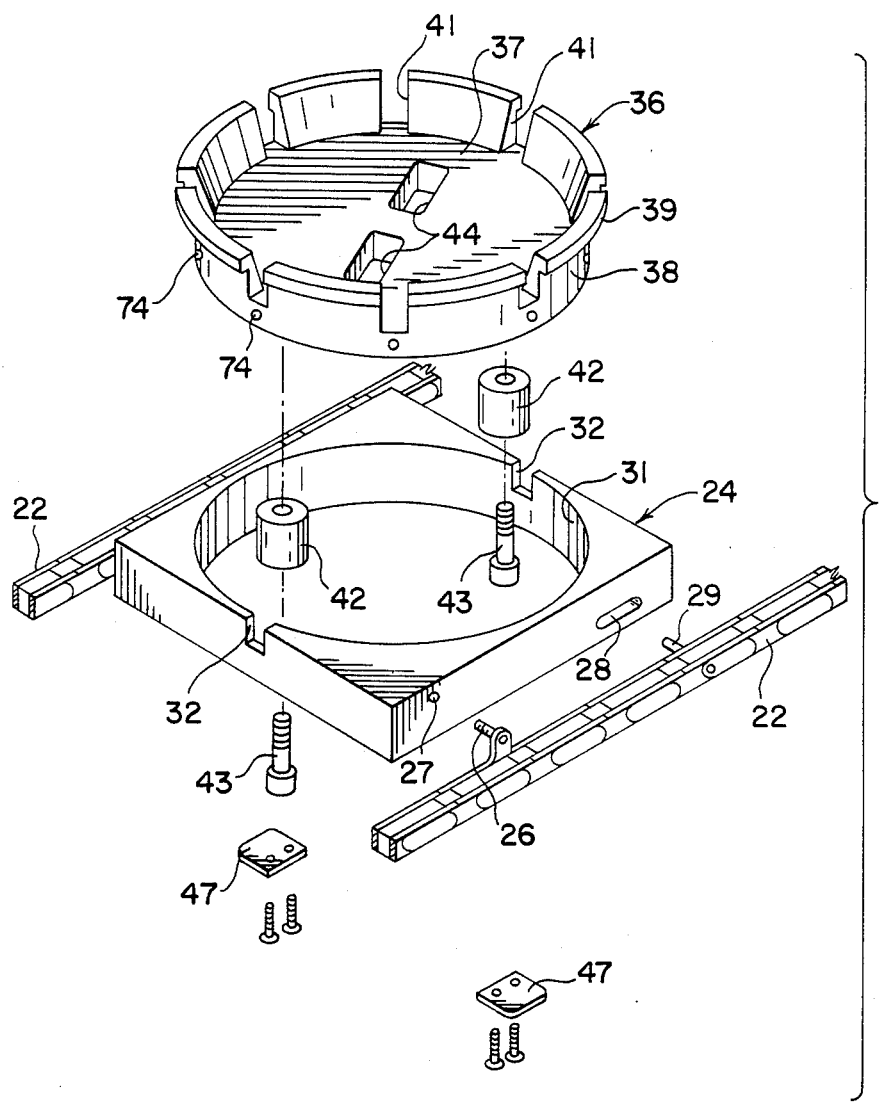
FIG. 10 is an exploded perspective view of a typical basket insert, an associated carriage block, and conveyor chain elements.

Fixed to the chains 22 are a closely packed series of carriage blocks 24. With particular reference to FIG. 10, there is shown a typical carriage block 24. The block 24 bridges the distance between the chains 22 and is fixed to the chains by opposed pins 26 received in aligned holes 27 in the blocks. The pins 26, on specially formed links of the chains 22, extend toward one another on a common axis parallel to the plane of the path of the upper reach of the chains 22 so as to mutually form a hinge axis for the block 24. Adjacent its forward end, the block 24 has a pair of slots 28 which receive opposed pins 29. The carriage block 24 is a generally planar body having a generally square or rectangular outer profile and a central, cylindrical bore 31 taking up most of the inscribed area of the block. A pair of aligned slots 32 are cut in the upper side of the block 24 through the midpoint of the front and rear walls of the block for clearance and passage through the cutting stations 11–14.

Figure 7:
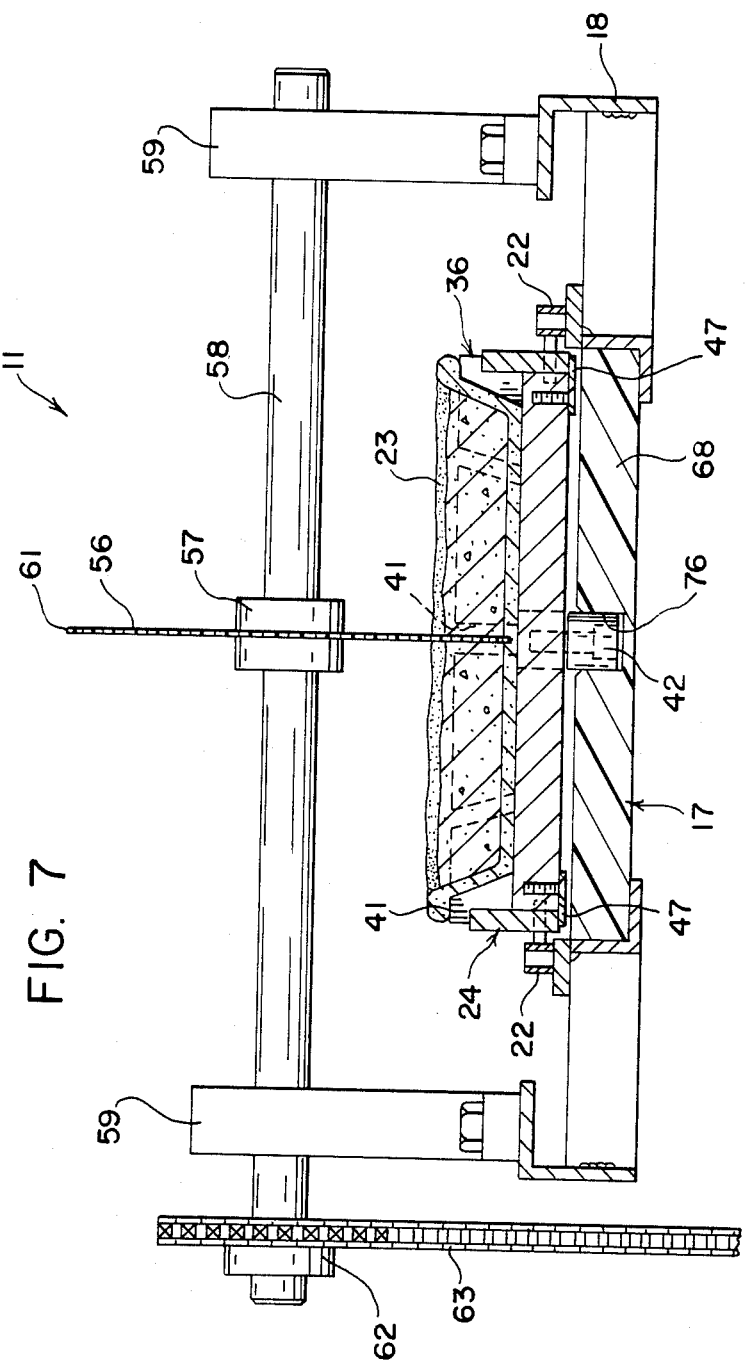
FIG. 7 is a cross-sectional view, taken in a transverse, vertical plane indicated by the lines 7—7 of FIG. 2, of a cutting station of the cutter apparatus.
Figure 8:
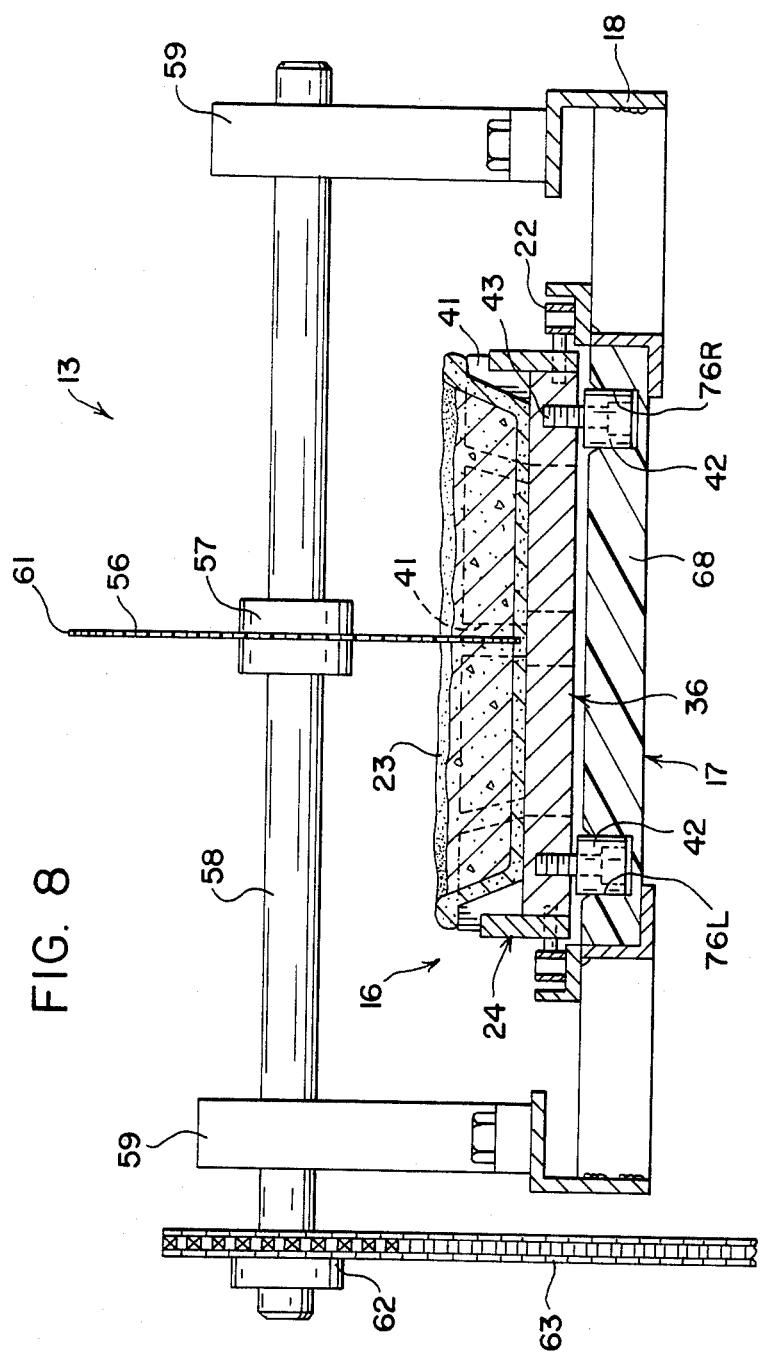
FIG. 8 is a view similar to FIG. 7, taken at another cutting station as indicated by the lines 8—8 in FIG. 2.

A generally round carrier basket insert 36 has a minor diameter at a circular end wall 37 sized to rotate freely within the carriage block bore 31. The combined thickness of the end wall 37 and height of the sidewall 38 is generally equal to the thickness of the carriage block 24 or depth of the bore 31. The basket insert 36 is assembled in the block 24 so that when upright it is suspended by a radially outwardly directed peripheral flange 39 on the free end of the sidewall 38, which is too large to pass through the carriage block bore 31 and thereby bears on the upper surface of the block 24. The sidewall 38 and flange 39 are machined or otherwise formed with a plurality of slots 41 running the full height of these elements above the end wall 37. The slots 41, in the illustrated case, are provided in diametrally opposed pairs, with each slot being angularly separated from an adjacent slot by 45 degrees. The slots 41 provide clearance for passage through the cutting stations 11–14. A pair of cylindrical cam follower rolls 42 are fixed for rotation about associated studs 43 threaded into the lower face of the basket end wall 37. The studs 43 are diametrally opposite one another and equally spaced from the center or axis of the basket insert 36. As indicated in FIGS. 7 and 8, the cam rolls 42 depend substantially below the lower faces of the carriage block 24 and basket insert 36. The basket end wall 37 is formed with diametrally opposite slots 44, which extend through the full depth of this wall. The basket insert 36 is retained in the carriage block bore 31 by clips 47 screwed to the underside of the basket end wall 37.

The conveyor 16 is adapted to receive articles 23 for slicing at a pickup or loading station, indicated generally at 51, at the left end of FIGS. 1 and 2. Articles 23 are carried from this pickup station 51 in a horizontal plane along the upper reach of the conveyor 16 to a discharge station indicated generally at 52 at the right end of FIGS. 1 and 2.

Diametral lines joining opposite pairs of notches or slots 41 in the sidewall 38 of the basket insert 36 have a predetermined angular relation to the diametral line joining the axes of the cam rolls 42 so that the angular orientation of the basket insert with respect to its associated carrier block 24 is determined by the relative attitude of the diametral cam roll line to the conveying or longitudinal direction of the chains 22.

The cutting stations 11–14 are substantially identical to one another. Each cutting station 11–14 includes, with particular reference to FIGS. 6–8, a rotary blade or wheel 56 having its hub 57 fixed to a shaft 58 bridging a respective portion of the upper reach of the conveyor 16. Opposite ends of the shaft are journaled in pillow block bearings 59. The axis of the shaft 58 is perpendicular to the longitudinal direction of the conveyor 16. The rotary blade 56 comprises a relatively thin disc of metal (for example, 0.040 inch thick) having serrations or teeth 61 over its full periphery. Preferably, the teeth 61 have no set, so that they lie in the plane of the blade 56. As indicated in the drawings, the plane of the blade 56 is vertical and is in vertical registration with the line of movement of the center of the carriage blocks 24 and basket inserts 36. The blade 56 is suspended at a vertical height at which its lowermost periphery lies slightly above the upper face of a basket insert end wall 37. A sprocket 62 is fixed to an outboard end of the shaft 58 for purposes of driving the blade 56 in rotation. As indicated in FIG. 4, the sprockets 62 of each cutting station 11–14 are coupled by roller chains 63 to right-angle drive gear boxes 64. In turn, the gear boxes 64 are mutually coupled by common shafting 66 driven by the conveyor gear motor 20. Where the product or article 23 to be sliced is food, the various components of the cutting stations 11–14 are preferably formed of stainless steel or other suitable material.

The cam track 17 is made up of a series of end-abutted plates 68. Each plate 68 has one or more grooves 76, 76R, 76L, cut in its upper face. The plates 68 are generally planar and rectangular. The plates 68 are preferably formed of suitable material which is self-lubricating, and are removably fixed on the frame 18 in close proximity to the path of the upper reach of the conveyor 16 so that the cam follower rolls 42 are received in the slots 76. The width of the slots or grooves 76 is closely fitted to the diameter of the cam follower rolls 42 so that there is a minimum amount of clearance between the vertical sides of the grooves and rolls. In another preferred embodiment of the invention, the plates 68 may be spaced apart and slots 76 may be interconnected with metal channel adapters. This permits accommodation of plates 68 to conveyor frames 18 of different lengths.

In operation, identical articles 23, such as pies ultimately for human consumption, are singly loaded, manually or automatically onto each basket insert 36 as the insert is presented to the loading station 51. The hollow configuration formed by the interior of the basket sidewall 38 and end wall 37 closely fits the exterior of an article 23. As a "reference" carriage block 24, loaded with an article 23, is drawn from the loading station 51, a leading cam roll 42 slips into a cam slot 76R. Upon further movement of the reference carriage block 24, a trailing cam roll 42 encounters the opposite slot 76L. As movement of this reference carriage block 42 progresses towards the first cutter station 11, its cam rolls 42 each encounter respective zones 81, 82 in the cam slots 76R, 76L that urge them in opposite directions lateral to the conveying direction. This opposed lateral movement in the horizontal plane of the cam track 17 results in a corresponding, precise angular displacement or index of the basket insert 36 in its respective carriage 24 (counterclockwise in plane view). During subsequent movement, as the reference carriage block 24 translates beneath the cutter station 11, the basket insert 36 and article 23 carried by it is prevented from rotation by the close fitting relation between the rolls 42 and the cam track slots 76. A spring-loaded detent ball 72 (FIG. 5) assembled in a blind bore 73 in a carriage block 24 coacts with an aligned detent hole 74 in the periphery of the basket end wall 37 to precisely angularly position the carrier basket 36 in the block at successive angular displacements.

In this phase of movement along the conveyor path, the basket insert 36, and reference carriage block 24 and article 23 carried in it, pass beneath the first cutter station 11. The angular relationship between the diametral line joining the cam rolls 42 and the lines between opposed slots 41 in the basket insert 36 is that at this cutter station 11 and subsequent stations 12–14, there is always a pair of slots in alignment with the conveying direction and providing clearance for a cutter blade 56.

As indicated in FIGS. 6–8, the vertical spacing between the lower periphery of the cutter blade 56 and the basket insert end wall 37 is arranged so that the blade cuts through substantially the full height of the article or product 23, while providing slight positive clearance between the lowermost edge of the blade and the upper surface of the basket end wall.

After leaving the first cutter station 11, where the article 23 is cut diametrally across basket insert 36 of the reference carriage block 24, the basket insert is again rotationally indexed when its cam rolls 42 engage zones 83,84 on the cam slots 76L, 76R. The resulting angular rotation of the basket insert 36 and article 23 contained therein is ordinarily substantially the same as that described previously. The reference carriage block and associated basket insert 36 pass below the second cutting station 12 and the article is cut along a second diametral line in the same manner as that described above with reference to the first station.

Zones 85, 86 in the cam slots 76L, 76R impart another angular displacement to the basket insert 36 and the article 23 in preparation for passage through the third cutting station 13. Later, zones 87, 88 in the slots 76R, 76L cause another rotational index of the basket insert 36 and article 23 prior to passing through the fourth cutter station 14.

Subsequent to passage through the fourth cutter station 14, the last cutting station illustrated, zones 89, 90 in the slots 76R, 76L rotate the basket insert 36 through an additional angle which, in the illustrated case, is one-half the amplitude of the typical angular rotation proceding entrance to the second and successive cutting stations.

Figure 9:
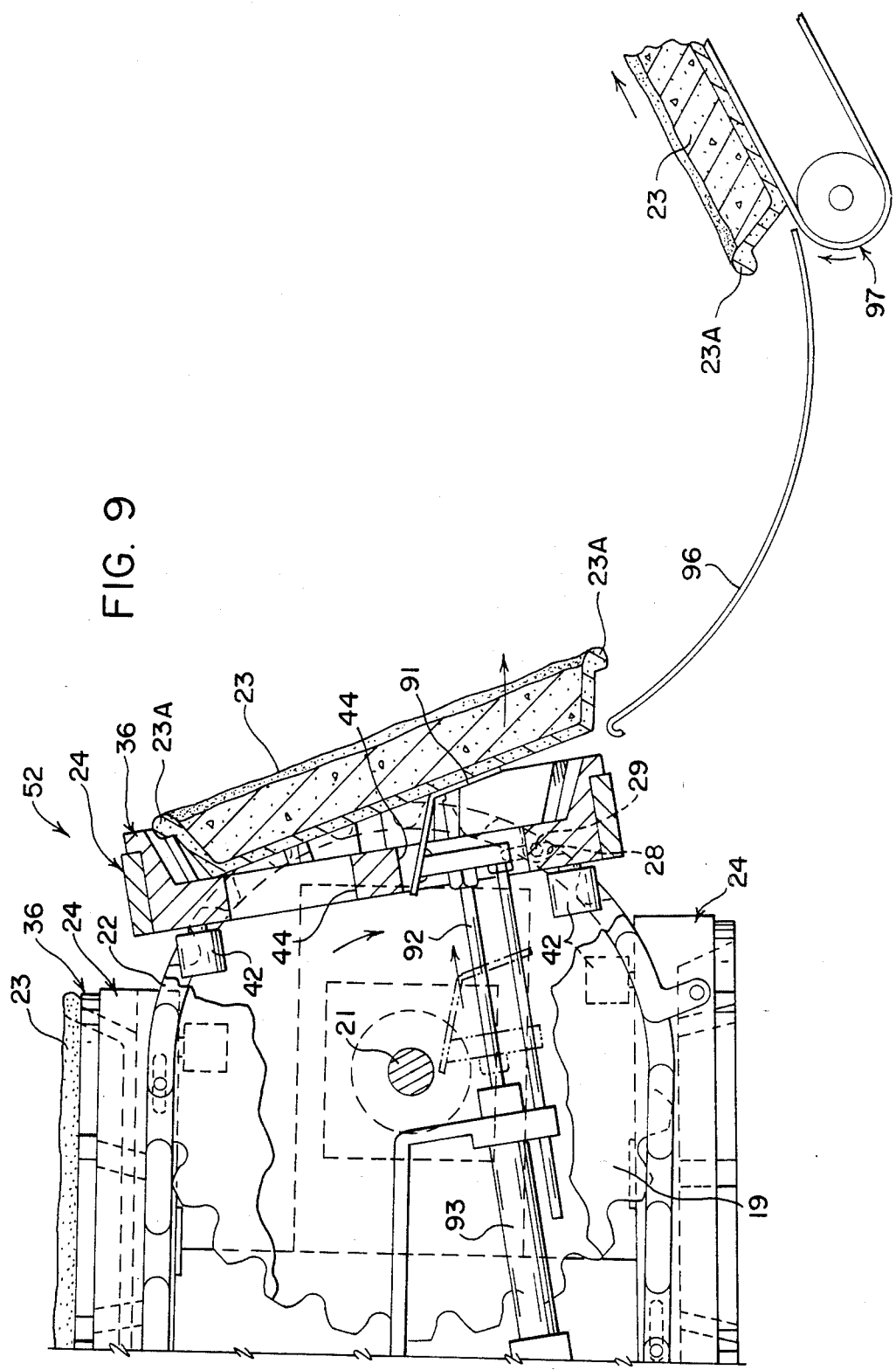
FIG. 9 is a vertical cross-sectional view, indicated by the lines 9—9 in FIG. 2, of a discharge end of the cutter apparatus.

After passing the last cutting station 14 and any subsequent cam track area, the reference carriage block 24, and article 23 carried in its associated basket insert 36, have completed their course through the processing or cutting path. With reference to FIG. 9, the article 23 is automatically unloaded from the basket insert 36 as the carriage block 24 begins to be inverted as portions of the chain 22 straddling it are trained over their respective sprockets 19. The article 23 is removed by gravitational force and an additional force imparted by a kicker bar 91. The kicker bar 91 is mounted on the piston rod 92 of an air cylinder actuator 93. The actuator 93 is energized to cause the bar 91 to contact and eject an article 23 when the carriage block 24 is nearly vertical. The kicker bar 91 operates through one of the two slots 44 in the basket insert end wall 37. The piston rod 92 and kicker bar 91 immediately retract so that continued movement of the block 24 and insert 36 is unimpeded. Because gravity acts on the whole of the article 23, and because the article is not cut completely through by the cutter blades 56, the kicker bar 91 is effective to knock the article completely from the basket insert 36. When dislodged, the article 23 falls along a chute 96 and is picket up and carried away by a take-off conveyor 97. The geometry of the chute 96 is arranged so that the upper ridge 23A of the piecrust cannot strike the chute 96.

It will be understood that the cutting process is continuous, and that at a particular moment, separate articles 23 can be sliced simultaneously at the several cutting stations 11–14.

It will be understood that the general arrangement of the apparatus 10 is adapted to produce as many slices of a single article as desired. While the disclosed embodiment is arranged to produce eight slices, it will be apparent that with the addition of another cutter station and suitable changes in the profile of the grooves 76 of the cam track 17, five equally spaced diametral cuts can be made to produce 10 slices from a single article. The article 23, as it is ejected at the discharge station 52, is readily subsequently fractured along the lines at which it has been cut by the cutter stations into the desired number of pieces.

While the invention has been shown and described with respect to a particular embodiments thereof, this is for the purpose of illustration rather than limitation, and other variations and modifications of the specific embodiments herein shown and described will be apparent to those skilled in the art all within the intended spirit and scope of the invention. Accordingly, the patent is not to be limited in scope and effect to the specific embodiments herein shown and described nor in any other way that is inconsistent with the extent to which the progress in the art has been advanced by the invention.

What is claimed is:

1. A rotary cutting machine comprising:
an endless conveyor;
a product holding carrier adapted to be transported by said conveyor;
a cam track adjacent said conveyor and longitudinally parallel thereto;
a plurality of rotary blade cutting means positioned at stations longitudinally along said conveyor to intercept said carrier as it is sequentially conveyed past said cutting means;
said carrier comprising an outer frame portion drivingly secured to said conveyor and an inner portion rotatable within said frame portion; and
a pair of cam followers secured to said inner portion and adapted to engage said cam track, whereby said inner portion may be angularly turned responsive to the location of said cam followers along said cam track, said cam track alternating between a single track and a double track, and including means to switch said pair of cam followers from said single track to one follower on each track of said double track whereby said inner portion is angularly shifted responsive to the shifting of said cam followers from said single track to said double track, one of said cutting means being positioned to intercept said inner portion after each angular shift, the relative spacing between the tracks of the double track varying at different stations of the cutting means in a manner which causes the product to be cut at angles of less than 90 degrees.

2. Apparatus for slicing a circular article into a plurality of equally sized wedges, comprising a longitudinally extending conveyor, an endless conveyor loop trained over rolls at opposite ends of the conveyor and forming upper and lower reaches, substantially identical carrier means fixed to the loop at spaced intervals, the carrier means each including a generally planar face mounted on the loop in a manner in which it is generally horizontal and faces upwardly when disposed on the path of the upper conveyor reach and is permitted to rotate about a substantially vertical axis, a series of horizontally spaced cutting blades suspended above the upper reach of the conveyor loop, said cutting blades lying in a common vertical plane passing through the vertical axes of the carrier means, and means responsive to horizontal movement of said carrier means between said cutting blades to rotationally index said carrier means about said vertical axes through an angle corresponding to the desired angular wedge size, the cutting blades each depending into the path of articles carried on said carrier means whereby such articles are cut on lines corresponding to the angular displacements of the carrier means induced by said indexing means, said indexing means including stationary cam means disposed along the path of the upper reach of the conveyor, follower means associated with said carrier means sensitive to the configuration of said cam means to produce corresponding rotation of said carrier means, said follower means including a pair of cam follower means diametrally opposite one another with respect to the axis of its associated carrier means, said cam means including a cam track having at least in several regions a pair of transversely spaced slots adapted to receive said follower means, said spaced slots and pair of cam follower means being arranged to rotationally index said carrier means through angles of less than 90 degrees.

3. Apparatus as set forth in claim 2, wherein said cutting blades are rotary wheels.

* * * * *